FIG. 1.

INVENTOR.
ARTHUR J. NELSON
BY Naylor & Neal
ATTORNEYS

INVENTOR.
ARTHUR J. NELSON
BY
Naylor + Neal
ATTORNEYS

United States Patent Office 3,432,704
Patented Mar. 11, 1969

3,432,704
SUBMERGIBLE APPARATUS MOTOR DRIVE
Arthur J. Nelson, Santa Barbara, Calif.
(1998 Broadway St., San Francisco, Calif. 94109)
Filed Aug. 4, 1966, Ser. No. 570,197
U.S. Cl. 310—87                           16 Claims
Int. Cl. H02k 5/10

ABSTRACT OF THE DISCLOSURE

This apparatus relates to submergible motors comprising a gas filled rotor chamber isolated from an oil filled stator chamber and from the liquid in which the apparatus is immersed. A liquid plug separates the gas from the liquid with gas pressure monitoring and control means regulating the liquid level below rotor journals within the rotor chamber. Regulators also balance the gas pressure with the pressure of the oil and with that of the liquid. A centrifugal governor controlled valve also confines the liquid plug from escape when the apparatus is not operating. Cooling means are employed for the various fluids and an independent filtered lube oil system is provided. In the apparatus each fluid has a single specific function.

---

A parallel arrangement of supplementary apparatus is made adaptable to similar environmental conditions by utilizing the above apparatus as the motor control.

The present invention relates to a submersible apparatus for confining a volume of gas under varying conditions of external pressure and, more particularly, is directed to such an apparatus wherein the confined volume of gas is maintained under a pressure substantially equal to that external thereto. In its more specific aspects, the invention is concerned with an apparatus for use in deep sea environments to contain equipment in a gas atmosphere free of deteriorating elements.

In the prior art, various designs have been employed to house equipment in submerged condition at sea and in other liquid environments. Although these designs have met with limited success, they have been of restricted reliability and dependability. Specifically, these designs typically have neither been well suited for use under continuously changing conditions of external pressure, nor continued maintenance free operation. The first of these shortcomings has generally resulted because the seal structures employed in such designs are not capable of accommodating varied pressure conditions. The latter of these shortcomings generally results because suitable means have not been provided to effect cleaning and cooling of lubricants and other fluids generally required for equipment operation.

It is, accordingly, a principal object of the present invention to provide a submergible apparatus of the type described above which overcomes the shortcomings of the prior art.

Another object of the present invention is to provide a submergible apparatus capable of establishing an environment in which well proved surface type equipment, such as electric motors, may be employed. With respect to this object, it is still a further object of the invention to provide an apparatus that may be submerged to practically any depth and is automatically controlled to provide a liquid free compartment independent of the varying depth of submergence.

Another object of the invention is to provide a submergible apparatus to house equipment wherein critical parts of the equipment are exposed only to inert fluids. With respect to this object, it is a further object of the invention to provide such an apparatus wherein fluids are maintained at a substantially constant temperature to thus optimize equipment performance, minimize volumetric changes of the fluids, and retard the rate of evaporation of any of such fluids which may be liquid.

Still another and more specific object of the invention is to provide a submergible apparatus for housing rotating elements, which apparatus is provided with self cooling and cleaning journal structure.

Yet another object of the invention is to provide a submergible apparatus capable of confining a plurality of fluids in isolated relationship under substantially equal pressure.

A further object of the invention is to provide groupings of submergible apparatuses having controlled environments wherein a common simplified control may be employed for the environmental control of an entire grouping.

As noted above, in its broader aspects the present invention is concerned with a submergible apparatus for confining a volume of gas under varying conditions of external pressure. This apparatus comprises, as a basic element, a housing defining a chamber having: an upper portion containing a volume of gas; a lower portion containing a volume of water; and, an intermediate portion containing a layer of buffer liquid interposed between and in fluid communication with the volumes of gas and water. The layer of buffer liquid is characterized in that it floats on the volume of water and is capable of functioning as a piston to isolate the respective volumes of water and gas from each other and preventing evaporation from the volume of water. Also included in the basic apparatus is structure to selectively open and close the lower portion of the chamber to a body of water in which the apparatus is submerged and, thus, internally subject the chamber to the pressure of the body of water. The basic apparatus thus provided is completed by gas supply and exhaust means communicating with the upper portion of the chamber to selectively supply and exhaust gas to and from the upper portion thereof and, control means to monitor the level of the layer of buffer liquid and control the operation of the gas supply and exhaust means responsive thereto to maintain the level within predetermined limits.

The foregoing description is merely intended to define the broader aspects of the invention. The reference to water in the description is merely exemplary of the manner in which the inventive apparatus would be characterized when employed in submerged condition in a body of water. If the apparatus were employed in submerged condition in a body of liquid other than water, this liquid would be substituted for the water in the above description. It is to be understood that the invention also includes more specific and additional characteristics which, together with the afore-enumerated and other objects, will become more apparent from the following detailed description and accompanying drawings, wherein:

Figure 1:
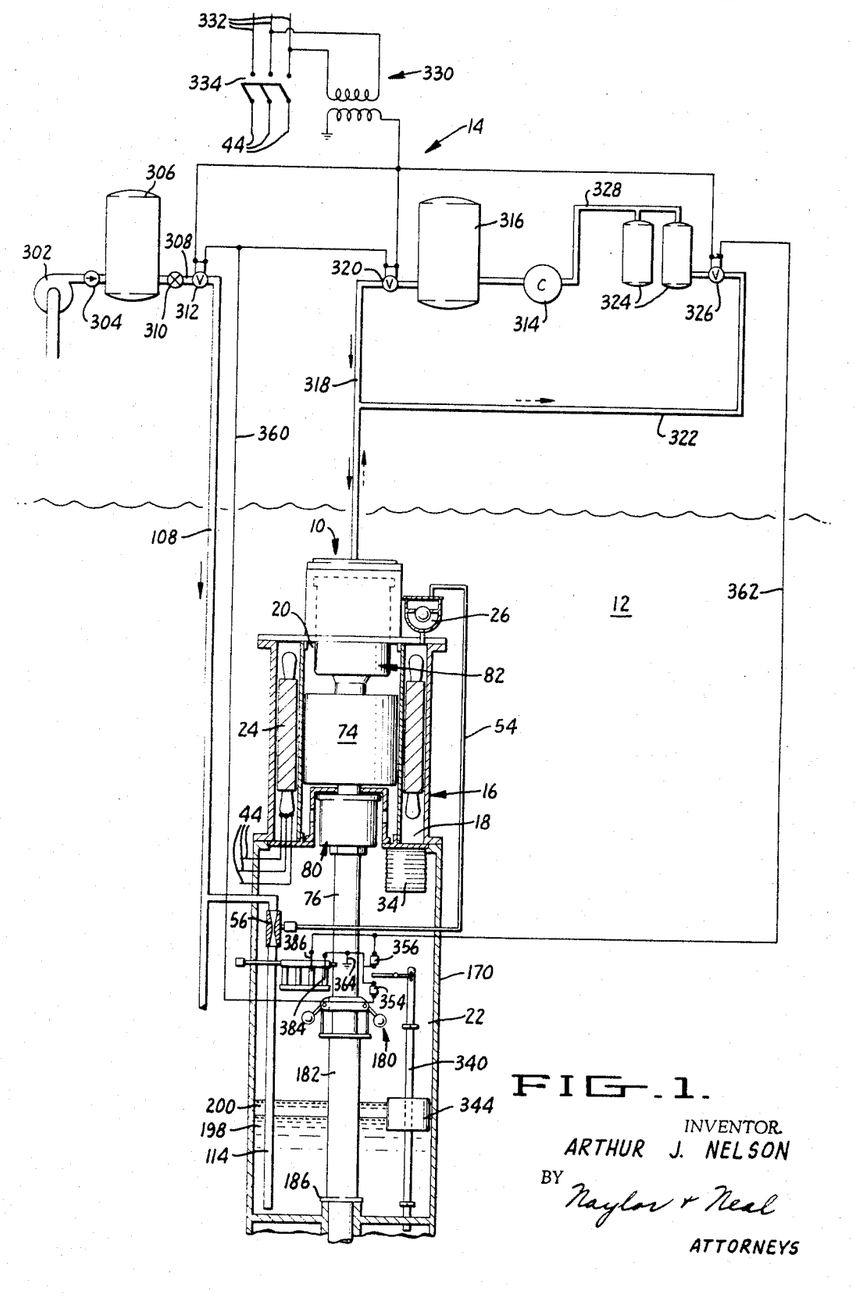
FIG. 1 is an elevational view diagrammatically illustrating a system incorporating the inventive apparatus.

Referring now to the drawings, and specifically to the system of FIG. 1, the submergible apparatus of the invention is designated therein by the numeral 10. The apparatus is diagrammatically illustrated as being submerged in a body of water 12, above which body of water is supported ancillary supply equipment for the apparatus, designated in its entirety by the numeral 14. It is to be understood that the supply equipment 14 could be supported on any suitable structure, such as a barge or platform.

In the exemplary embodiment illustrated, the apparatus 10 is comprised of an electric motor housing 16 defining therein a stator chamber 18, a rotor chamber 20, and a buffer chamber 22. The stator chamber 18 is isolated from fluid communication with the rotor and buffer chambers and contains therein a stator 24 and a stator immersing oil 26. The oil 26 has dialectic properties similar to those of transformer oil and functions as a coolant bath for the stator 24. Cooling of the oil 26 is effected through means of a continuous tubular coil 28 of spiral configuration. The upper and lower extremities of the coil 28 communicate with the stator chamber 18 through connections 30 and 31, respectively. Through this arrangement, a convection current is set up in the cooling coil and thus the oil is continuously circulated and cooled to control temperature of the stator 24. It is noted that the coil 28 extends externally of the housing 16 and, thus, the coils are cooled by direct contact with a body of water in which the apparatus may be submerged.

The static pressure of the oil 26 contained in the stator chamber 18 is maintained at a pressure equal to that of the buffer chamber 22 through means of a flexible diaphragm element, in the form of a bellows 34, communicating internally with the stator chamber and externally with the buffer chamber. Communication between the bellows 34 and the interior of the stator chamber is established by a fluid connection 36. The lower end of the bellows 34 has secured in sealed fluid communication therewith a water trap 38. Although the oil 26 in the stator chamber is normally sealed from the entrance of water thereinto, the trap 38, which is preferably transparent, functions both to collect water and to serve as a visual indication of such water when the apparatus 10 is serviced. In the illustrated embodiment, a second water trap 40, corresponding identically to the trap 38, also communicates with the stator chamber 18 through means of an electrical lead connector 42. The lead connector 42 provides for the fluid tight extension of electrical leads 44 to connection with the stator 24.

To assure that gas will not collect in the stator chamber 18, a vapor trap 46 of the "Armstrong type" is secured in fluid communication with the upper extremity of the chamber. The trap 46 is of conventional nature and includes a lower reservoir portion 48 and an upper vapor collecting portion 50, between which portions is interposed a float valve device 52. Vapor collected in the portion 50 is exhausted therefrom by a conduit 54 connected in fluid communication therewith and extending to a gas ejector induction device 56. The device 56, the operation of which will become more apparent subsequently, simply comprises a venturi type restriction passageway 58 having an opening 60 extending into the low pressure restricted area thereof to which the conduit 54 is connected. A check valve 62 is interposed in the conduit 54 upstream of the device 56 to assure that flow cannot take place from the device 56 to the trap 46.

The rotor chamber 20 and the upper portion of the buffer chamber 22 are connected in fluid communication by openings 64 extending therebetween and contain a non-oxidizing gas 66. The gas 66 may be of any non-oxidizing variety, such as nitrogen. Cooling of this gas is continuously effected through means of a conduit cooling coil 68 disposed externally of the housing 16 and connected in sealed fluid communication between the upper extremity of the rotor chamber 20 and an intermediate portion of the buffer chamber 22. Connections 70 and 72 secure the coil 68 to the rotor and buffer chambers, respectively. Through the vertically spaced relationship of the connections 70 and 72, convection currents are set up in the coil 68 to effect continuous cooling of the gas 66 in a manner similar to that of the oil 26.

Figure 2:
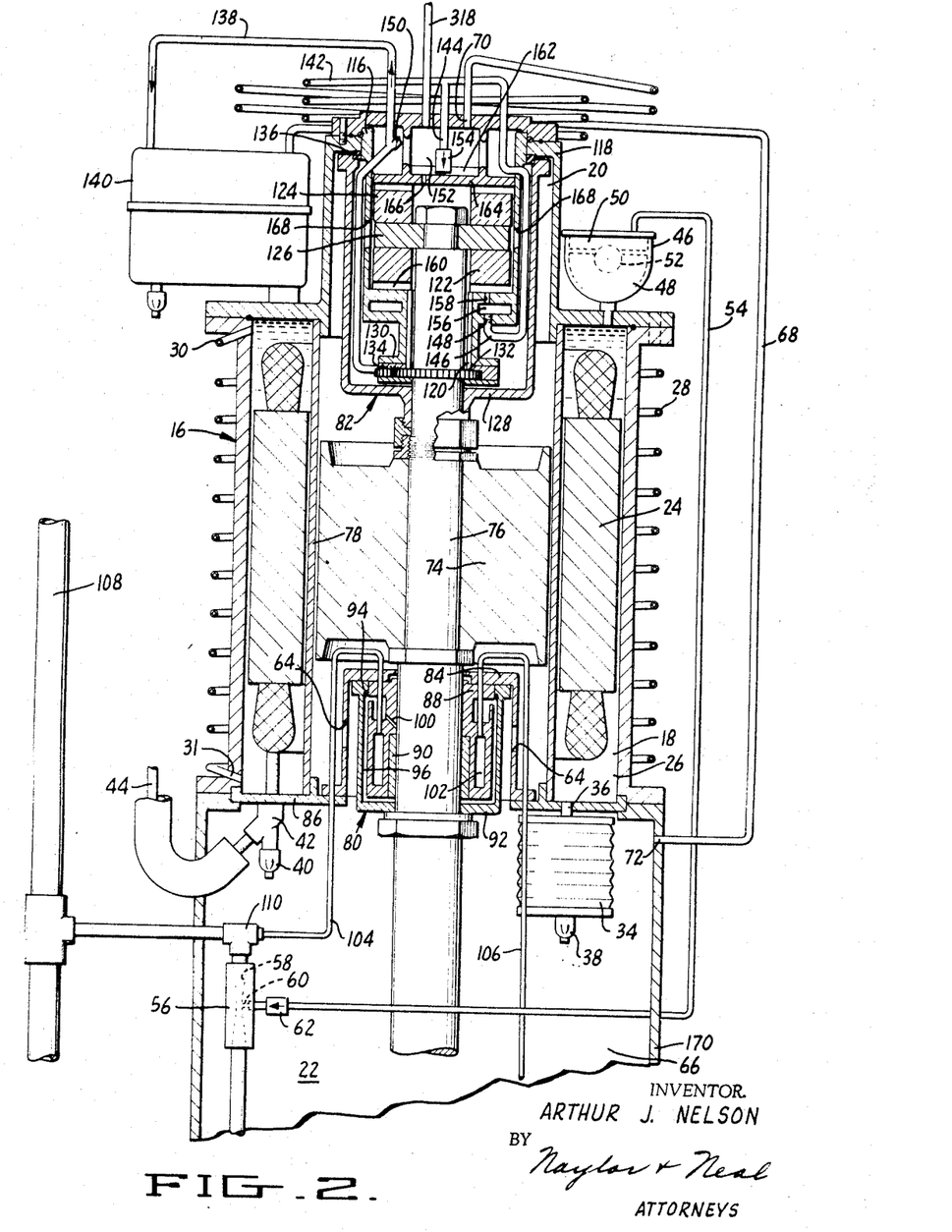
FIG. 2 is an elevational sectional view illustrating the upper portion of the inventive apparatus.

A rotor 74 of relatively conventional nature, having a support shaft 76 fixed thereto and extending axially therethrough, is disposed in the buffer chamber 20 within the confines of the stator chamber 18. It is here noted that the stator chamber 18 is of annular configuration and is confined externally by the outer wall of the housing 16 and internally by a closed annular wall 78. The rotor 74 is supported for rotational movement about the longitudinal axis of the shaft 76 by journal assemblies 80 and 82. The journal assembly 80 is of the type disclosed in my previous U.S. Patent No. 2,466,324, and is designed primarily to carry radial loads. The assembly 80 basically comprises: a rigid structure 84 fixedly mounted on the housing 16 through means of connection with a wall 86 defining the lower extremity of the stator chamber 18; a sleeve bearing support 88 fixed to the structure 84 and extending around the shaft 76; a sleeve bearing 90 fixed to the support 88 in mating relationship with the shaft 76; a tank 92 of annular configuration sealingly fixed to the shaft 76 and extending upwardly around the bearing support 88; and, a sealing ring 94 interposed between the upper portions of the bearing support 88 and the tank 92. The bearing support 88 and tank 92 define therebetween an annular chamber 96 communicating with the lower and upper extremities of the bearing 90. As can be seen from FIG. 2, lower communication of the chamber 96 with the bearing 90 is direct and upper communication is established through means of passageways 100 (only one of which is illustrated). The chamber 96 contains lubricating oil to a partial degree and, upon rotation of the chamber with the shaft 76, this oil is thrown centrifugally outwardly and upwardly. Thus, the oil is continuously circulated between the lower and upper extremities of the bearing 90. Cooling of the journal assembly 80 is effected through means of an annular water chamber 102 extending through the outer sleeve bearing support 88 and communicating with water inlet and outlet conduits 104 and 106, respectively. The water inlet conduit 104 communicates directly with a main water supply conduit 108 extending to a source of water supply included in the equipment 14. The main water supply conduit 108 also supplies water to the device 56 through means of a T-connection 110. The water outlet conduit 106 extends to an open exhaust end 112 disposed adjacent the lower extremity of the buffer chamber 22. It is here noted that the device 56 also exhausts to a point adjacent the lower extremity of the buffer chamber 22. This exhaust is effected through means of a conduit 114 having one end connected in fluid communication with the passageway 58 and the other end open to the lower extremity of the buffer chamber 22.

The journal assembly 82 supports the shaft 76 both radially and axially and comprises: a support structure 116 fixedly mounted on the housing 16 through means of an upper extension 118 provided on the housing; a sleeve bearing 120 fixed to the structure 116 and axially mounted around the shaft 76 for radial support thereof; a pair of primary annular thrust bearing elements 122 and 124 fixed to the structure 116; a secondary annular thrust bearing element 126 fixed to the shaft 76 between the elements 122 and 124 for axial support thereby; an annular tank 128 fixed to the shaft 76 and extending upwardly therefrom around the structure 116 for rotation relative thereto; a gearpump 130 disposed within the tank 128 in driving engagement between the shaft 76 and structure 116, said pump having an inlet 132 in close proximity with the lower extremity of the tank 128 and an outlet 134; and, an annular seal 136 sealingly interposed between the tank 128 and the extension 118 of the housing 16. The tank 128 is similar to the tank 92 in that it contains a lubricating oil to a static level somewhat less than its total capacity. This level is preferably somewhat above the contacting surfaces between the primary thrust bearing elements 122 and 124 and the secondary thrust bearing element 126. Upon rotation of the shaft 76, however, the oil contained in the tank 128 is thrown centrifugally outwardly and upwardly and thus assumes the level beneath the contacting surfaces of the primary and secondary bearing elements.

The journal 82 has connected thereto a filtering and cooling circuit for the oil contained in the tank 128. This circuit comprises: a first conduit 138 secured in fluid communication at one end thereof with the outlet 134 of the gear pump 130 and extending at the other end thereof externally of the housing 16; a filter 140 having an inlet secured in sealed fluid communication with the externally extending end of the conduit 138; a condiut cooling coil 142 disposed externally of the housing 116 and secured in sealed fluid communication with the outlet of the filter 140; a second conduit 144 extending in fluid communication between the coil 142 and the interior upper portion of the journal assembly 82; and, a third conduit 146 extending in sealed fluid communication between the coil 142 and an inlet port 148 in the support structure 116. The conduit 138 has interposed therein a vacuum-breaking checkvalve 150 adapted to open the conduit to a gas chamber 152 disposed immediately beneath the upper extremity of the housing 116 and in fluid communication with the rotor chamber 20 through ports (not illustrated). Through the checkvalve 150, upon shutdown on the gear pump 130, as occurs when the shaft 76 is stopped, the vacuum in the oil filtering and cooling circuit is broken to permit oil return to the tank 128. The conduit 144 also has interposed therein a checkvalve 154. This valve, however, functions to close the conduit 144 upon shutdown of the gear pump 130.

In operation of the journal assembly 82, oil entering the inlet port 148 is directed through an annular chamber 156 formed in the support structure 116 and forced therefrom through a port 158 into an annular reservoir 160 extending around the shaft 76 in fluid communication with the bearing interface between the shaft 76 and bearing 120 and the bearing interface between the elements 122 and 126. Thus, during operation of the gear pump 130, these interfaces are continuously supplied with lubricating oil. Oil discharged from the conduit 144 is received in a reservoir 162 defined by a plate 164 fixed to and extending across the structure 116. Upon entering the reservoir 162, the oil passes through a port 166 in the plate 164 to the bearing interface between the bearing elements 124 and 126. Thus, during operation of the gear pump 130, the latter interface is also continuously supplied with lubricating oil.

The aforedescribed lubricating oil directing arrangement of the journal assembly 82 has the advantage that the bearing interfaces are continuously supplied with cool filtered oil during rotation of the shaft 76. Circulation of this oil from the bearing interfaces between the elements 122, 124 and 126 is facilitated by ports 168 provided in the structure 116 in opposed relationship to the element 126. During rotation of the shaft 76, the centrifugal action of the element 126 functions to centrifugally throw oil through the ports 168.

Turning now to the buffer chamber 22, it is here noted that this chamber, together with the control structure cooperating therewith, functions to continuously maintain the interior of the housing 16 at a pressure substantially equal to that to which the housing is subjected externally. Thus, regardless of the depths at which the apparatus 10 is submerged, the chambers therein are not subjected to any appreciable pressure differentials.

The buffer chamber 22 is defined by an annular sidewall 170 sealingly secured to the outer peripheral wall of the stator chamber 18. The wall 170 extends downwardly from the stator chamber and is closed at the lower portion thereof by a closure wall 172 fixed thereto. The wall 172 is of annular configuration and supports centrally thereof a bearing collar 174 through which the shaft 76 rotatably extends. Rotation of the shaft 76 within the collar 174 is facilitated by a sleeve bearing 176 fixed to the shaft and rotatably received within the collar. The collar 174 and bearing 176 are so proportioned relative to each other as to define therebetween an annular space 178 through which water may be flushed, as will become apparent from the subsequent discussion. Although not illustrated, it is anticipated that flushing through the annular space 178 may be facilitated by spiral grooves formed in the interior surface of the collar 174.

Figure 3:
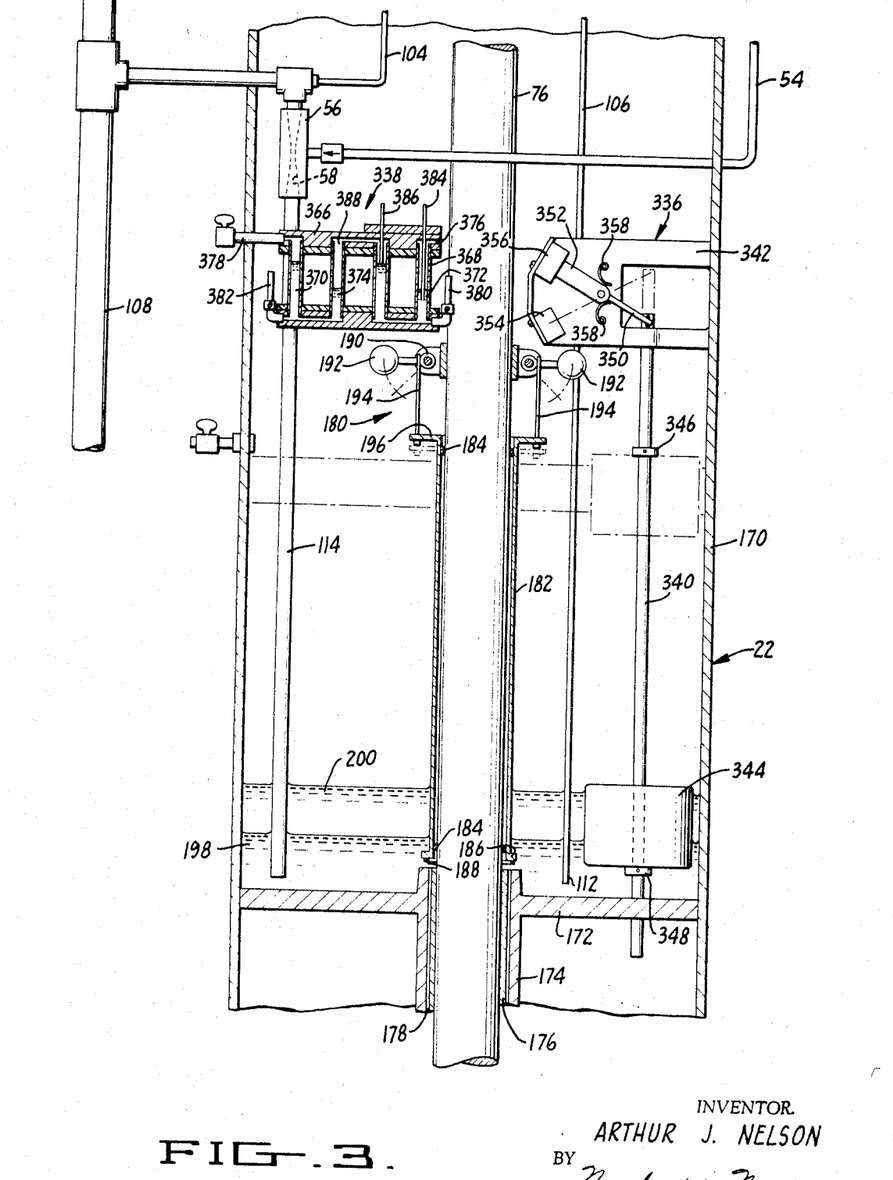
FIG. 3 is an elevational sectional view illustrating the lower portion of the inventive apparatus.

Selective opening and closing of the annular space 178 responsive to starting and stopping, respectively, of the shaft 76 is provided by a centrifugal closure mechanism 180. The mechanism 180 comprises: an elongated sleeve 182 received around the shaft 76 for axial and rotational movement relative thereto by bearing and sealing elements 184; a collar 186 fixed to and extending around the lower extremity of the sleeve 182; an annular gasket 188 secured to the lower surface of the collar 186 for sealing engagement with the collar 174 upon lowering of the sleeve 182; a support fixture 190 fixed to the shaft 76 for rotation therewith and having pivotally mounted thereon ball-weighted centrifugal levers 192; and, links 194 connected between the levers 192 and a collar 196 fixed to and extending radially from the sleeve 182. In operation, upon rotation of the shaft 76, the levers 192 swing outwardly to the solid line position illustrated in FIG. 3 and, thus, raise the sleeve 182 to a position opening the annular space 178 to the interior of the buffer chamber 22. Conversely, upon termination of shaft rotation, the centrifugal levers 192 swing downwardly to the phantom line positions illustrated in FIG. 3 and, thus, force the sleeve 182 down to a position wherein the gasket 188 functions to seal the annular space 178 from the interior of the buffer chamber.

The buffer chamber 22, as noted in the foregoing discussion, contains in the upper portion thereof a non-oxidizing gas 66 common with that in the rotor chamber 20. The lower portion of the buffer chamber contains water 198 which, during operation of the apparatus 10, is continuously supplied thereto through means of the conduits 106 and 114. Also contained in the buffer chamber 22 is a layer of buffer fluid 200 interposed between the volumes of gas and water contained therein in floating relationship with the water. The fluid 200 is suitably chosen so as to be immiscible with the water 198 and to prevent the evaporation of said water into the gas contained in the buffer chamber. Thus, the buffer fluid functions as a piston isolating the volumes of gas and water. Silicone liquids of the type commercially available have been found to possess the characteristics desired in the buffer fluid.

It is here noted that the ancillary supply equipment 14 is controllably associated with the control structure for the buffer chamber. In the exemplary embodiment illustrated, this equipment includes a water supply system and a gas supply system. The water supply system simply comprises: a pump 302 leading from a source of water and discharging through a checkvalve 304 preventing reverse flow through the pump; a tank 306 connected in fluid communication with the pump discharge to contain water under pressure; an outlet pipe 308 secured in fluid communication between the tank 306 and the main supply conduit 108; and, manually and electrically operable shutoff valves 310 and 312, respectively, interposed in the pipe 308. The gas supply system comprises: a compressor 314; a high-pressure storage tank 316 secured in fluid communication with the discharge of the compressor 314; a conduit 318 extending in fluid communication between the tank 316 and the gas chamber 152 disposed in the upper end of the housing 16; an electrically operable shutoff valve 320 interposed in the conduit 152 and the valve conduit 322 secured in fluid communication with the conduit 318 intermediate the chamber 152 and the valve 320 and extending therefrom to fluid communication with a series connected pair of gas collection tanks 324; an electrically operable shutoff valve 326 interposed in the conduit 322; and, a discharge conduit 328 extending in fluid communication between the collection tanks 324 and the inlet of the compressor 314. Electric power is supplied to the valves 312, 320, and 326 through a transformer power supply 330 of conventional nature. This power supply, together with the compressor 314, pump 302, and stator 24 is powered by a main power supply on the installation supporting the supply equipment 14. The main power supply lines are designated by the numeral 332 in FIG. 1 and are shown connected to the stator 24 through a switching device 334. The electrical leads 44 for the stator 24 are connected directly to the device 334.

In operation of the equipment 14, the pump 302, compressor 314, and device 334 are preferably activated prior to submergence of the apparatus 10. Thus, a supply of pressurized water and gas is built up in the tanks 306 and 316, respectively, and the rotor 74 is energized. The tanks 306 and 316, respectively, have cooperating therewith pressure responsive control means of conventional nature to control the operation of the pump 302 and compressor 314. Thus, the pressure within the tanks is maintained at a predetermined level. Discharge from the tanks 306 and 316 and exhaust into the tanks 324 is controlled, as will become more apparent subsequently, responsive to the condition of the buffer chamber 22.

The control structure in the buffer chamber 22 comprises a float control mechanism 336 designed to control the level of the bucer fluid 200 during normal rotative operation of the shaft 76 and a pressure differential mechanism 338 designed to prevent the occurrence of excessive pressure in the buffer chamber in the event that rotation of the shaft 76 is interrupted. The float control mechanism comprises: a rod 340 mounted in the buffer chamber between the wall 172 and a support fixture 342 for substantially unrestricted rectilinear movement over a limited path; a float 344 slidably received on the rod 340 and buoyantly supported on the water 198 and buffer fluid 200 contained in the buffer chamber 22; upper and lower stop collars 346 and 348, respectively, fixed to the rod 340 for engagement by the float 344 upon the raising and lowering thereof beyond predetermined limits; a lever 350 pivotally mounted intermediate the ends thereof on the fixture 342, said lever having one end thereof engaged with the rod 340 for raising and lowering thereby and the other end thereof supporting a metallic vane 352; a pair of magnetic vane operated switches 354 and 356 positioned for passage of the vane 352 thereinto to effect their alternate closure; and, a pair of leaf springs 358 mounted on the fixture 342 in engagement with the lever 350 to resiliently bias the lever to a position wherein the vane 352 is disposed intermediate the switches 354 and 356.

It is here noted that the electrically controllable valve 312 is designed to normally assume an open condition and that the electrically controllable valves 320 and 326 are designed to normally assume a closed condition. These valves, as can be seen from the schematic representation of FIG. 1, are controllably associated with the switches 354 and 356. Specifically, the switch 354 is connected to the valves 312 and 320 by an electrical lead 360 and the switch 356 is connected to the valve 326 by an electrical lead 362. Each of the switches 354 and 356 is connected to a ground 364 common with that to which the power supply 330 is connected. As a result of this overall arrangement, closing of the switch 354 functions to close and open, respectively, the valves 312 and 320 and closing of the switch 356 functions to open the valve 326. Thus, upon closing of the switch 354 responsive to raising of the float 344, water supply to the buffer chamber through the conduit 108 is terminated and gas supply through the conduit 318 is commenced. As a result, the volume of gas contained in the buffer chamber is increased and the buffer fluid 200 is depressed to a level wherein the vane 352 assumes a neutral position between the switches 354 and 356. Upon the latter occurrence, the valves 312 and 320 return to normal condition. Upon closing of the switch 356 responsive to lowering of the float 344, the valve 326 is opened, thus permitting gas to exhaust through the conduit 322 into the tanks 324. As a result of this operation, the level of the buffer fluid 200 is permitted to raise and the vane 352 eventually assumes a position intermediate the switches 354 and 356. Upon the latter occurrence, the valve 326 returns to the normally closed condition.

The aforedescribed float control mechanism is operative to sense conditions of excess pressure externally of the housing 16 irrespective of the condition of the closure mechanism 180. Specifically, excess water pressure externally of the housing will function to admit water through the space 178 and into the buffer chamber 198 whether the gasket 188 be raised from or engaged with the collar 174. In the latter event, the excessive pressure functions to raise the gasket 188 from engagement with the collar 174. As a result of this operation, the float 344 and the switch 354 function to control deficient pressure in the buffer chamber even when the shaft 76 is not rotating. The float 344 and switch 356 are not, however, capable of similarly effecting control of excessive pressure in the buffer chamber when the shaft 76 is not rotating. This results because, upon the termination of shaft rotation, excessive pressure functions to assist the levers 192 in seating the gasket 188 and, thus, the escape of water from the buffer chamber is prevented.

The pressure differential mechanism 338 is provided to prevent the occurrence of excessive pressure in the rotor and buffer chambers in the event that rotation of the shaft 76 is terminated and pressure external of the housing is decreased. The mechanism 338 comprises: a multi-stage manometer 366 contained in the buffer chamber 22 and having first and second U-tubes 368 and 370 connected in series and each containing therein, respectively, a volume of mercury 372 and 374, respectively; a conduit section 376 extending in fluid communication between the U-tube section 368 and the gas-filled interior of the buffer chamber; a conduit section 378 extending in fluid communication between the U-tube 370 and the exterior of the housing 16; a pair of fill pipes 380 and 382 having shutoff valves incorporated thereinto communicating with the U-tubes 368 and 370, respectively, to facilitate the introduction of mercury thereinto; and, a pair of electrodes 384 and 386 disposed in the legs of the U-tube 368 with the ends thereof in vertically spaced relationship. The volume connecting the U-tubes 368 and 370 between the mercury contained therein is filled with an incompressible oil 388. The electrodes 384 and 386, as can be seen from the schematic representation of FIG. 1, are connected to the valve 326 in parallel with the switch 356. This is effected by a connection of the electrode 384 with the ground 364 and a connection of the electrode 386 with the electrical lead 362.

In operation of the mechanism 338, the volume of mercury 372 contained in the U-tube 368 normally does not contact the electrode 386 and, thus, the valve 326 remains in the normally closed position. However, when the pressure within the buffer chamber 22 relative to that external of the housing 16 exceeds a predetermined limit, the volume of mercury 372 is forced to a position wherein the electrode 386 is contacted. Upon the latter occurrence, the circuit between the electrodes 384 and 386 is completed and, thus, the valve 326 is activated to vent gas from the apparatus. After sufficient gas has been vented to remove the volume of mercury 372 from contact with the electrode 386, the valve 326 again returns to its normally closed condition.

It is to be understood that the apparatus 10 may be used to power any desired type of submerged device. For example, as will become more apparent from the subsequent discussion of the FIG. 4 system, the apparatus may be used to power a centrifugal pump. To effect driving connection of the apparatus, it is merely necessary to couple the end of the shaft 76 projecting externally of the rotor 74 to the shaft desired to be driven. It is anticipated that a plurality of apparatuses corresponding to the apparatus 10 might be employed in a submerged installation at varying levels. In this event, it is preferred that a series supply system of the type disclosed in my aforementioned Patent No. 3,359,741 be employed to supply and exhaust gas from each apparatus. This type of system has the advantage that gas supplied to the apparatuses at increasing depths is compressed in stepwise fashion and that power requirements for compression are maintained at a minimum. A system of this type is illustrated, partially, in FIG. 4.

Figure 4:
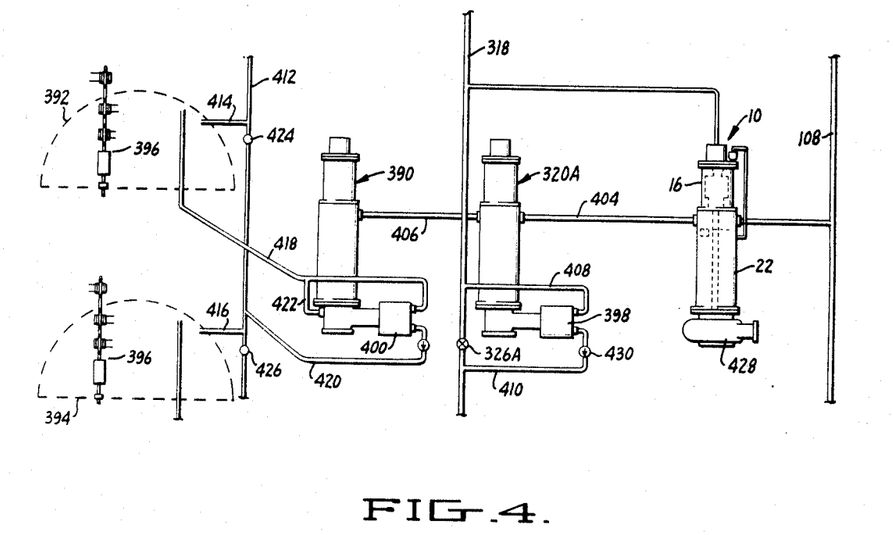
FIG. 4 is an elevational view diagrammatically illustrating a system of the type disclosed in my copending application Ser. No. 533,627, filed Mar. 11, 1966, now Patent No. 3,359,741 incorporating the inventive apparatus with a plurality of pump driving units located at essentially the same elevation; and, FIG. 5 is a partial elevational sectional view illustrating the drive arrangement for one of the reciprocating pumps employed in the system illustrated in FIG. 4.

Referring now specifically to FIG. 4, the apparatus 10 is illustrated therein incorporated into a system of the type disclosed in my Patent No. 3,359,741. This system comprises, in addition to the apparatus 10 and supply conduits 108 and 318 therefor: a first compressor unit 320A (corresponding in system function to the electrically operable shut-off valve 320); a second compressor unit 390; pontoons 392 and 394; and, conduit means operatively connecting the apparatus 10, compressors 320A and 390, and pontoons 392 and 394 into the system. It is here noted that the arrangement of the compressor 390 and pontoons 392 and 394 corresponds, respectively, to the arrangement of the compressor (145) and pontoons (31) and (32) of my Patent No. 3,359,741. Similarly to the pontoons in the latter application, the pontoons 392 and 394 each include float responsive buoyancy control structure, designated by the numeral 396.

The compressor units 320A and 390 are each driven by an apparatus corresponding to the apparatus 10, with the exception that it includes neither the independent control for the environmental gas contained therein nor the buffer and water flushing provision. The latter characteristics may be omitted from the drive apparatuses for the units 320A and 390 because these apparatuses depend upon the apparatus 10 for their contained environmental gas control and the drive shafts of these apparatuses are not disposed so as to be exposed to a fluid environment in which the apparatuses may be submerged. The latter characteristic results because the drive shafts of the units 320A and 390 are coupled, respectively, in driving engagement with the crank shafts of compressors 398 and 400 having sealed gas containing crank cases. The compressors 398 and 400 are of the reciprocating type and correspond substantially in construction. This construction can be seen from the sectional representation of the compressor 400 in FIG. 5. The apparatuses 320A and 390 differ, however, in that a mercury seal 402 is provided between the apparatus 390 and compressor 400, whereas no such seal is provided between the apparatus 320A and compressor 398. The seal 402 is provided to isolate the gases contained in the apparatus 390 and the crank case of the compressor 400 from each other since, as will become more apparent subsequently, these gases do not correspond.

The conduit means of the system illustrated in FIG. 4 comprises, in addition to the water supply conduit 108 and gas supply conduit 318 for the apparatus 10: a first environmental gas conduit 404 connected between the buffer chamber 22 of the apparatus 10 and the gas containing interior of the apparatus 320A; a second environmental gas conduit 406 connected between the gas containing interior of the apparatus 320A and the gas containing interior of the apparatus 390; gas conduits 408 and 410, respectively, connected between the inlet and outlet of the compressor 398 and the conduit 318; a main air supply and exhaust conduit 412 extending from a source of air under pressure (such as that illustrated in my Patent No. 3,359,741) to the FIG. 4 system; air conduits 414 and 416 connected, respectively, between the conduit 412 and the interior of the pontoons 392 and 394; an air conduit 418 connected between the interior of the pontoon 392 and the inlet of the compressor 400; an air conduit 420 connected between the conduit 412 and the outlet of the compressor 400; and, an air conduit 422 connected between the crank case of the compressor 400 and the conduit 418. The conduit 318 has interposed therein between the conduits 408 and 410 a normally closed solenoid valve 326A having a function relative to apparatuses which may be disposed beneath the system illustrated in FIG. 4 corresponding to the function of the valve 326. Specifically, the valve 326A is controlled by an apparatus, corresponding to the apparatus 10, located beneath the FIG. 4 system to selectively effect the venting of gas from the apparatus. The conduit 412 has interposed therein, respectively, beneath the conduits 414 and 416 normally closed solenoid valves 424 and 426. The latter valves correspond in function, respectively, to the valves (143) and (143a) in my Patent No. 3,359,741. Since these valves function similarly to effect the selective venting of the pontoon therebeneath, only the function of the valve 424 will be developed in the subsequent discussion.

It is here noted that the apparatuses 10, 320A and 390 of the FIG. 4 system are all located at substantially the same elevation and that the apparatus 10 is coupled to a centrifugal pump 428.

In operation of the FIG. 4 system, the gas environment maintained in the inerior of the apparatuses 320A and 390 is controlled by the apparatus 10. This results because the conduits 404 and 406 establish fluid communication between the buffer chamber 22 of the apparatus 10 and the interior gas containing chambers of the apparatuses 320A and 390.

The FIG. 4 system is also adapted to cooperate with an apparatus 10 which may be situated therebelow through means of the apparatus 320A and the compressor, conduit and valve structure cooperating therewith. When so employed, the apparatus 320A and the valve 326A are associated with the control structure of the apparatus therebelow in a manner corresponding, respectively, to the association between the apparatus 10 and the valves 320 and 326 illustrated in FIG. 1. Thus, the apparatus 320A and valve 326A are selectively activated responsive to the apparatus disposed therebelow to effect the selective charging and discharging of gas from said apparatus. Gas so charged and discharged is drawn from and exhausted to the buffer chamber of the apparatus 10 illustrated in FIG. 4. As a result of the latter characteristic, where apparatuses 10 are employed at varying levels in the manner suggested by FIG. 4, compression of gas is effected in stepwise fashion in a manner similar to that disclosed in my Patent No. 3,359,741. In the FIG. 4 system, the return of gas from the conduit 318 through the conduit 410 is prevented by a checkvalve 430.

The air supply arrangement of the FIG. 4 system is adapted to operate in stepwise compression fashion in much the same manner as the aforedescribed gas supply system. In this arrangement, the buoyancy control structure 396 of the pontoon 394 is controllably associated with the apparatus 390 and valve 424 to effect the selective charging and discharging of gas from the pontoon 394. Specifically, when the structure 396 senses excessive buoyancy in the pontoon 394, the valve 424 is opened to vent air into the pontoon 392 through the conduit 414. Similarly, when the structure 396 senses insufficient buoyancy in the pontoon 394, the apparatus 390 is activated to pump and compress gas from the pontoon 392 into the pontoon 394. Although not specifically illustrated, it is here noted that the compressor 400 of the apparatus 390 is located at substantially the same level as the pontoon 392. Thus, since the interior of the pontoon 392 is maintained at the pressure of a body of fluid in which it is submerged similarly to the interior of the apparatus 390, the pressures in the gas chamber of the apparatus 390 and the crankcase of the compressor 400 are equal.

The latter pressure characteristic of the compressor crank case results because the conduit 422 establishes communication between the interior of the pontoon 392 and the interior of the crank case.

The aforedescribed equal pressure characteristic of the apparatus 390 and compressor 400 facilitates the employment of the mercury seal 402 to maintain isolated atmospheres in the apparatus and compressor. This equal pressure characteristic is maintained substantially constant, even with the continuous change in crankcase volume which results from reciprocating action of the compressor piston. This results because the crank case is in continuous fluid communication with the volume of gas contained in the interior of the pontoon 392 and this volume is so large as to make the continuous changes in crankcase volume resulting from compressor piston movement infinitesimal by comparison.

Figure 5:
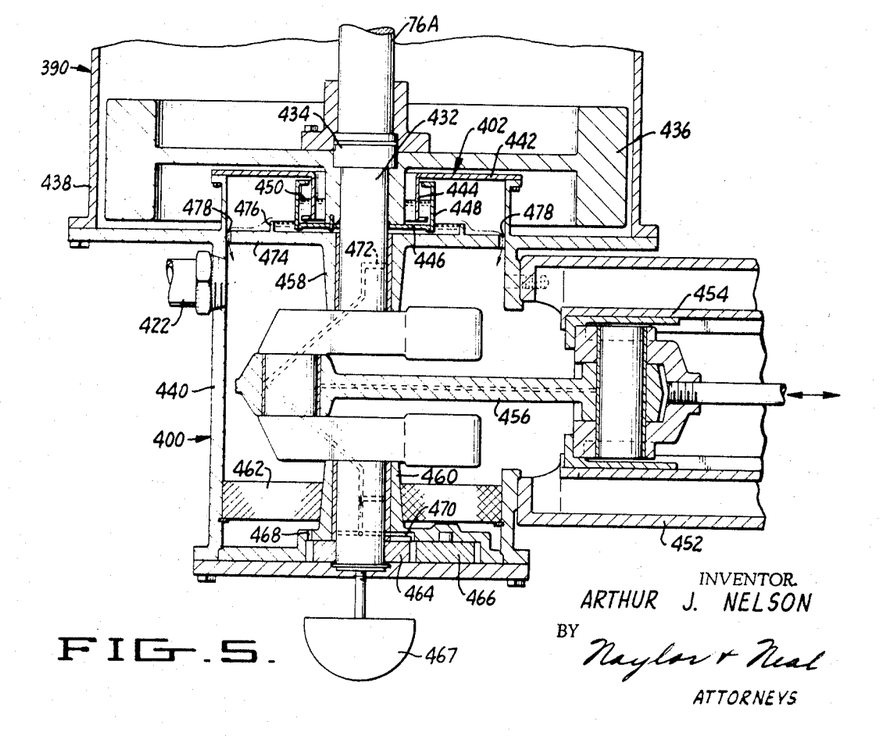

Referring now specifically to FIG. 5, the apparatus 390 is illustrated therein as having a drive shaft 76A corresponding to the shaft 76 of the aforedescribed apparatus 10. The shaft 76A is coupled in driving engagement with the crankshaft of the compressor 400, designated by the numeral 432, by a coupling 434. The crankshaft 432 has mounted thereon within the confines of the apparatus 390 a flywheel 436. As illustrated, the apparatus 390 and compressor 400 include, respectively, housings 438 and 440 sealingly secured together by peripheral flanges. Where the crankshaft 432 extends into the housing 440, it is surrounded by the aforedescribed mercury seal 402. This seal is of relatively conventional construction and comprises: an annular plate 442 sealingly secured to the upper extremity of the housing 440 and having depending therefrom a downwardly extending collar 444; an annular plate 446 fixed to and extending radially from the lower midportion of the flywheel 436; a collar 448 fixed to and extending upwardly from the plate 446 around the collar 444; and, a body of mercury 450 contained in the reservoir defined by the plate 446 and collar 448.

The compressor 400 is of the reciprocating type and comprises, in addition to the crankshaft 432 and housing 440: a cylinder 452 fixed to and extending radially from the housing 440; a cross-head and guide assembly 454 received in the cylinder 452; a connecting rod 456 operatively secured between the crankshaft 432 and the head of the cross-head and guide assembly 454; upper and lower sleeve bearing journals 458 and 460, respectively, mounted on the housing 440 in supporting engagement with the crankshaft 453; an annular oil strainer received in the housing 440 around the journal 460; a gear pump disposed in the lower portion of the housing 440 comprised of a drive pinion 464 keyed to the shaft 432 and an idler pinion 466; and, a water trap 467. Although not illustrated, it is to be understood that the cylinder 452 is provided with conventional valving structure and that a piston is mounted therein in driving engagement with the cross-head of the assembly 454. The gear pump provides for pressure lubrication of the compressor and includes an inlet passage 468 and an outlet passage 470. The outlet passage communicates with oil passages in the crankshaft and connecting rod of conventional nature. The uppermost of these passages, designated by the numeral 472 communicates with the journal 458 and, through this journal, discharges over an annular plate 474 defining, in part, the upper wall of the housing 440. The plate has formed thereon an annular collar 476 defining an oil reservoir and has extending therethrough oil passages 478. Through the latter arrangement, a reservoir of oil is contained above the journal 458 and, as this reservoir overflows, the overflow discharges back into the compressor housing. Upon return to the compressor housing, discharged oil passes through the strainer 462 and into the inlet passage 468.

From the foregoing description, it is believed apparent that the present invention enables the accomplishment of the objects initially set forth herein. It is to be understood, however, that the invention is not intended to be limited to the specific details of the exemplary embodiments herein described, but rather is defined by the following claims.

What is claimed is:

1. In an electric motor drive unit for submergence under water, comprising:
    (a) a housing defining therein a gas filled centrally disposed rotor chamber and an oil filled annular stator chamber extending around said rotor chamber in fluid isolated relationship relative thereto;
    (b) a rotor received in said rotor chamber and having a support shaft fixed thereto and extending axially through said chamber;
    (c) a stator received in said stator chamber;
    (d) journal means mounted on said housing and axially positioning the support shaft of said rotor to effect rotatable support of said rotor in the rotor chamber;
    (e) oil lubrication means for said journal means; an improved system maintaining oil in said stator chamber, comprising:
        (1) an independent oil cooling circuit connected in fluid communication with said chamber to continuously circulate oil through said chamber during motor operation and effect cooling of said oil; and,
        (2) pressure responsive means cooperating between said rotor and stator chambers to equalize the pressure maintained on the oil in said stator chamber with the pressure maintained on the gas in said rotor chamber.

2. In a drive unit according to claim 1, the improved system further including:
    (a) separation means operatively associated with said stator chamber to collect moisture that may contaminate the oil therein;
    (b) trap means operatively associated with said stator chamber to collect vapor or gas that may become entrained in the oil therein; and,
    (c) ejection means operatively associated with said trap means to exhaust vapor or gas collected therein.

3. In a drive unit according to claim 1, the improved system further including:
    (a) a buffer chamber included in said housing and disposed beneath and in sealed fluid communication with said rotor chamber, said buffer chamber having:
        (1) a gas filled upper portion open to and common with said rotor chamber;
        (2) a water filled lower portion; and,
        (3) an intermediate portion containing a layer of buffer liquid in floating relationship over the water in said lower portion to isolate said water from the gas contained in said upper portion and rotor chamber, said buffer liquid being capable of substantially preventing the evaporation of water therethrough;
    (b) means to open and close said lower portion to a body of water in which the unit is submerged responsive, respectively, to driving activation and deactivation of said rotor whereby, upon activation of said rotor, the interior of said buffer and rotor chambers are subjected to the external pressure of a body of water in which the unit is submerged and, upon deactivation of said rotor, said lower portion is sealed to retain said buffer liquid against loss.

4. In a drive unit according to claim 3, the improved system further including:
    (a) gas supply and exhaust means operatively associated with said housing to selectively supply and exhaust gas to and from the gas contained in said rotor and buffer chambers; and,
    (b) primary control means to monitor the level of said layer of buffer liquid and control operation of said gas supply and exhaust means responsive thereto to maintain said level within predetermined limits.

5. In a drive unit according to claim 4, the improved system further including a gas cooling circuit connected in fluid communication with the gas contained in said rotor and buffer chambers and extending externally thereof to effect cooling of said gas.

6. In a drive unit according to claim 4, the improved system wherein:
   (a) the support shaft for said rotor projects through and externally of the lower portion of said buffer chamber for external connection; and,
   (b) said means to open and close the lower portion of said buffer chamber comprises:
      (1) a bearing in said buffer chamber received around said shaft at the projection thereof through said chamber, said bearing being proportioned relative to said shaft to define a passage to permit the flow of water between said shaft and bearing; and,
      (2) a collar received around said shaft, said collar being adapted to open and close said passage to the flow of water therethrough upon driving activation and deactivation, respectively, of said shaft;
and said system further including water injection means to continuously admit water into the lower water containing portion of said buffer chamber during driving activation of said rotor to effect flushing of water between said shaft and bearing.

7. In a drive unit according to claim 6, the improved system further including secondary control means to monitor the pressure differential between the gas contained in said housing and a body of water in which said unit is submerged and control operation of said exhaust means responsive to said differential to prevent the pressure in said housing from exceeding that to the exterior of said housing by more than a predetermined degree.

8. In a drive unit according to claim 6, the improved system wherein said water injection means comprises a first fluid conveying conduit extending between a selectively operable source of water under pressure and the interior of said lower portion of said buffer chamber.

9. In a drive unit according to claim 8, the improved system further including:
   (a) separation means operatively associated with said stator chamber to collect moisture that may contaminate the oil therein;
   (b) trap means operatively associated with said stator chamber to collect gas that may become entrained in the oil therein; and,
   (c) ejection means to exhaust gas collected in said trap means, said ejection means comprising:
      (1) a venturi restriction in said first fluid conveying conduit having a low pressure inlet therein; and,
      (2) a second fluid conveying conduit extending between said trap means and the inlet of said venturi restriction to establish fluid communication therebetween.

10. In a drive unit according to claim 3, the improved system wherein said pressure responsive means comprises a fluid impervious diaphragm element interposed between the gas contained in said rotor and buffer chambers and the oil contained in said stator chamber.

11. In a drive unit according to claim 1, wherein said journal means includes at least one pair of mating bearing elements disposed for rotation relative to each other, said system further including lubrication means for said bearing elements, comprising:
   (a) an annular oil reservoir sealingly fixed to said shaft and extending around said bearing elements, said reservoir containing oil to a level adapted to:
      (1) immerse said elements when said rotor is deactivated and said shaft is in a static condition; and,
      (2) displace from said elements under the influence of centrifugal force when said rotor is activated to rotate said shaft and reservoir;
   (b) means to supply oil from said reservoir to said elements when said rotor is activated to rotate said shaft and reservoir; and,
   (c) an independent oil cooling and filtering circuit adapted to effect the continuous cooling and filtering of oil supplied to said elements during activation of said shaft.

12. A system for submergence in a fluid under varying conditions of external pressure, said system comprising:
   (a) a first motor housing defining a chamber having:
      (1) an upper portion containing a volume of gas, a stator and a rotor;
      (2) a lower portion containing a volume of fluid corresponding to that in which the system is to be submerged; and,
      (3) an intermediate portion containing a layer of buffer liquid interposed between and in fluid communication with said volume of gas and of fluid in floating relationship over said latter volume, said buffer liquid functioning solely as a piston to isolate said respective volumes and being capable of substantially preventing the evaporation of fluid from said volume of fluid into said volume of gas;
   (b) means to selectively open and close the lower portion of said chamber to a body of fluid in which said system is submerged to subject the interior of said chamber to the pressure of said body of fluid;
   (c) gas supply and exhaust means communicating with said chamber to selectively supply and exhaust gas to and from the upper portion of said chamber;
   (d) primary control means to monitor the level of said layer of buffer liquid and control operation of said gas supply and exhaust means responsive thereto to maintain said level within predetermined limits;
   (e) a second motor housing defining a closed chamber located at substantially the same elevation as the chamber of said first housing;
   (f) conduit means establishing sealed fluid communication between the upper portion of the first housing chamber and the second housing chamber, whereby gas is supplied to the chamber of said second housing at a pressure corresponding to that in chamber of said first housing;
   (g) drive means comprising an electric motor disposed in the chamber of said second motor housing;
   (h) a driven machine operatively associated with said drive means for activation thereby; and,
   (i) a secondary gas containing chamber housing said driven machine against intrusion by fluid in which said system may be submerged.

13. A system according to claim 14, wherein:
   (a) said driven machine comprises a reciprocating fluid pump having a crank mechanism coupled to said driven shaft for driving thereby;
   (b) a portion of said secondary gas containing chamber defines a crank case for said crank mechanism;
   (c) said seal means is interposed between the portion of said secondary chamber defining the crank case and the chamber of said second housing;
   (d) said reciprocating pump has a fluid inlet and an outlet, said inlet being at a fluid pressure substantially equal to the pressure of the gas supplied to said second housing;
the system further comprising conduit means establishing fluid communication between the crank case and fluid inlet to maintain the fluid pressure within said case substantially equal to that of the chamber of said second housing.

14. A system according to claim 12 further comprising seal means isolating said secondary chamber from the chamber of said second housing, said means being capable of transmitting fluid pressure therethrough and wherein:
(a) said motor has a vertically disposed rotatably driven shaft extending from the rotor thereof, and
(b) said driven machine is operatively associated with said drive means by connection to said driven shaft.

15. In a submergible drive unit comprising:
(a) a motor housing defining a primary chamber containing a gaseous medium under controlled pressure conditions; and,
(b) a drive means comprising an electric motor in said chamber; a driven unit comprising:
a driven unit comprising:
  (1) a driven machine operatively associated with said drive means for activation thereby;
  (2) a secondary chamber housing said driven machine against instrusion by a fluid in which said drive unit may be submerged, said secondary chamber containing therein a gaseous medium; and,
  (3) seal means interposed between said primary and secondary chambers to effect the isolation thereof, said means being capable of transmitting fluid pressure therethrough.

16. In a submergible drive unit according to claim 15, wherein said electric motor has a vertically disposed rotatably driven shaft extending therefrom and the driven unit is characterized in that:
(a) said driven machine is operatively associated with said drive means by connection to said driven shaft; and,
(b) said seal means comprises a mercury seal having the mercury confining elements thereof sealingly secured, respectively, to said shaft and housing in concentric relationship to said shaft.

References Cited
UNITED STATES PATENTS

| | | |
|---|---|---|
| 3,241,492 | 3/1966 | Arutunoff. |
| 2,887,062 | 5/1959 | Cametti et al. |
| 2,556,435 | 6/1951 | Moehrl. |
| 2,361,854 | 10/1944 | McCormack _________ 310—52 |
| 2,020,513 | 2/1934 | Mendenhall et al. _____ 310—87 |
| 2,002,907 | 5/1935 | Sessions _________ 310—87 XR |
| 1,879,625 | 9/1932 | Mendenhall et al. ____ 310—87 |
| 1,842,457 | 1/1932 | Mendenhall et al. _____ 310—87 |

MILTON O. HIRSHFIELD, *Primary Examiner.*

M. O. BUDD, *Assistant Examiner.*

U.S. Cl. X.R.

138—31; 310—52